Nov. 1, 1966 H. W. MOSER ET AL 3,282,175

PROGRESSIVE SCORING MECHANISM FOR GLUED FLAP BOX GLUER-FOLDER MACHINES

Filed Oct. 14, 1963 6 Sheets-Sheet 1

INVENTORS:
HENRY W. MOSER
WILLIAM GROBMAN

BY Howson & Howson

ATTYS.

INVENTORS:
HENRY W. MOSER
WILLIAM GROBMAN
BY Howson & Howson
ATTYS.

Nov. 1, 1966 H. W. MOSER ET AL 3,282,175

PROGRESSIVE SCORING MECHANISM FOR GLUED FLAP BOX GLUER-FOLDER MACHINES

Filed Oct. 14, 1963 6 Sheets-Sheet 3

INVENTORS:
HENRY W. MOSER
WILLIAM GROBMAN
BY Howson & Howson
ATTYS.

INVENTORS:
HENRY W. MOSER
WILLIAM GROBMAN
BY Howson & Howson
ATTYS.

INVENTORS:
HENRY W. MOSER
WILLIAM GROBMAN
BY Howson & Howson
ATTYS.

INVENTORS:
HENRY W. MOSER
WILLIAM GROBMAN
BY Howson & Howson
ATTYS.

United States Patent Office 3,282,175
Patented Nov. 1, 1966

3,282,175
PROGRESSIVE SCORING MECHANISM FOR GLUED FLAP BOX GLUER-FOLDER MACHINES

Henry W. Moser, Haddonfield, N.J., and William Grobman, Philadelphia, Pa., assignors to Samuel M. Langston Company, Camden, N.J., a corporation of New Jersey Filed Oct. 14, 1963, Ser. No. 316,067
10 Claims. (Cl. 93—58.1)

The present invention relates generally to glued flap box folding machines and more specifically to a portion of such overall machines relating to a multi-stage re-scoring and glueing section in the gluer-folder portion of the machine.

Heretofore in gluer folder machines, pre-printed and scored and slotted box blanks have been glued and folded ultilizing various mechanisms. The prior known machines provided satisfactory score lines where the blanks would only receive a 90° bend between adjacent panels in the erection of the box. However, those score lines about which the adjacent panels of the box blank were to be folded at an angle of 180° resulted in out of squareness and quality of the fold was not good and many times resulted in blisters, tears or other defects. In effect what is required, is a deeper and more sharply defined score line to overcome these drawbacks and it has been found that accenting or re-scoring of the 180° score lines following the printer-slotter section in which the blanks have been initially scored could not be accomplished by one pair of score wheels, since this often stretches the liners past their elastic limit. The progressive accented re-scoring of the present invention avoids the drawbacks of previous machines and has permitted producing uniformly folded boxes with good gap control.

It is accordingly a primary object of the present invention to provide a re-scoring apparatus wherein the score lines previously effected in a printer-slotter are accented and more clearly defined.

It is a further object of the invention to provide such mechanism in the nature of a gang multiplicity of pairs of scoring wheels in a folder-gluer.

Another object of the present invention is to provide means for re-scoring of blanks to improve the accuracy and uniformity with which the blank can be folded in subsequent operations and wherein complete accuracy is defined with respect to subsequent fold rails and bars.

An additional object is to provide a re-scoring device capable of making a score line in stages which results in a more sharply defined score line without cracking of the liners.

Another object of the present invention is to provide apparatus capable of producing a hinge type score by progressively changing the shape of each score and which is not possible with a single impression.

An additional object of the present invention is to provide in a device of this nature a multiplicity of pairs of scoring wheel wherein the upper and lower wheels of each pair are held in fixed lateral relationship to each other and to the folding rail over which the fold is made.

A still further object of the invention is to provide in such a machine means permitting vertical adjustment of one scoring wheel in each pair and also gang adjustment of a group of wheels.

A further object of the invention is to provide means permitting adjustable pressure for applying adjusted pressure to the adjustable gang of wheels as also, selectively, adjustable pressure to any single pair of wheels.

Other and additional objects and advantages of the present invention will be more readily apparent from the following detailed description of an embodiment thereof when taken together with the accompanying drawings in which.

Figure 3:
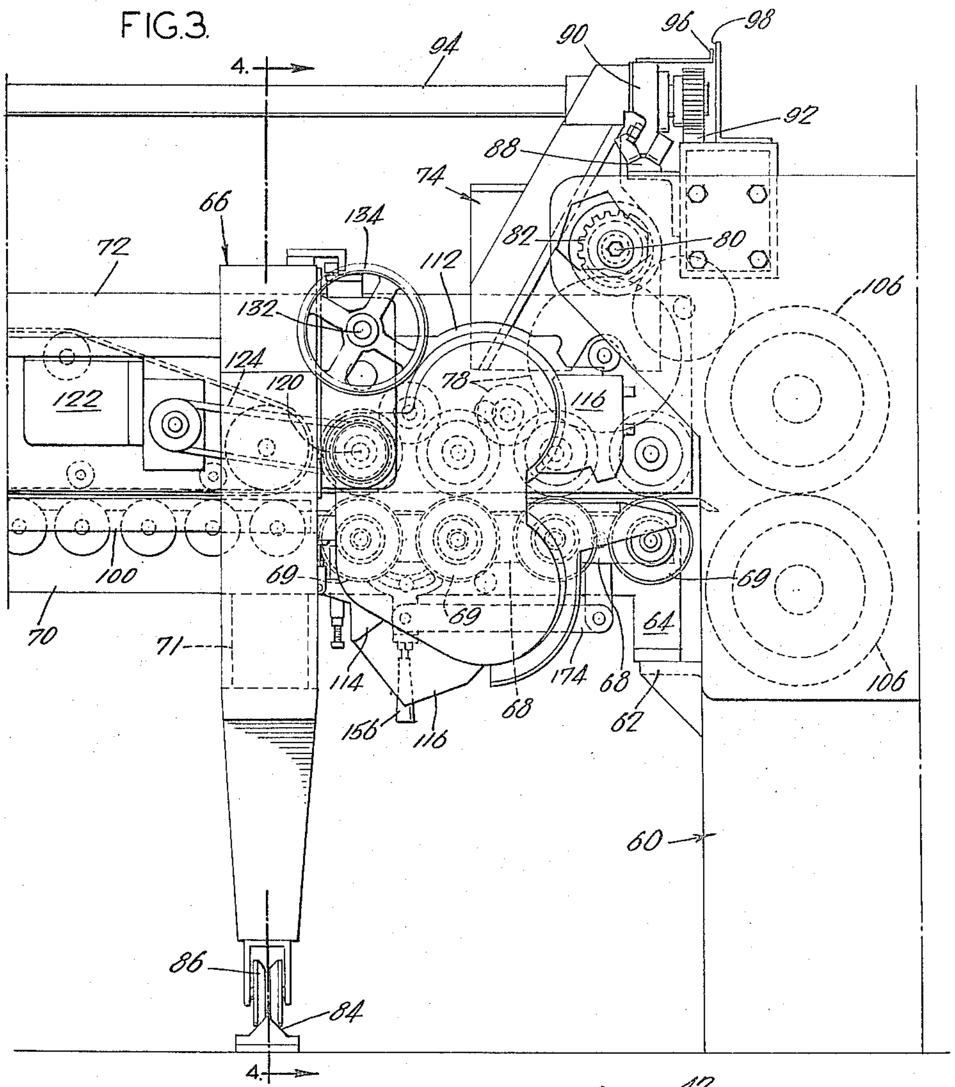
FIG. 3 is an elevational view of that portion of a folder-gluer machine wherein the present invention is utilized for re-scoring of score lines previously processed in the printer-slotter section of an overall printer-slotter gluer-folder machine.

Referring now to the drawings, emphasis has been placed on the re-scoring section of an overall printer-slotter gluer-folder machine for glued flap box folding machines and this section is the forward portion of the gluer-folder section. In the drawings, the rear section of a printer-slotter machine is schematically shown in FIG. 3 for orientation of the present invention and in which an initial scoring has taken place. A fragmentary portion of the folding section is also shown at the left-hand of FIG. 3 for orientation purposes.

Figures 1, 2:
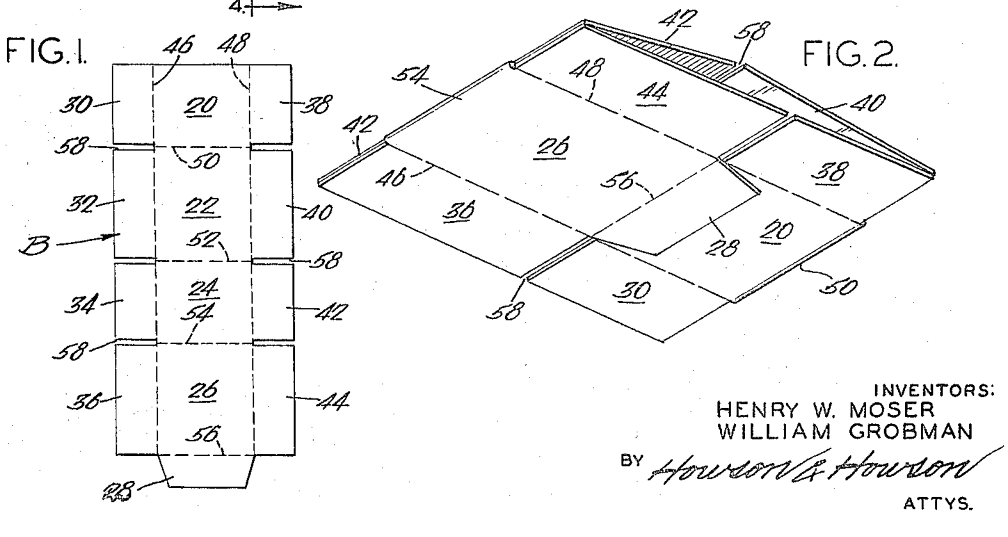
FIG. 1 is a plan view of a box blank of a type adapted for processing in the present invention.
FIG. 2 is a perspective view of the blank of FIG. 1 shown in a condition after processing through the gluer-folder.

The present invention is adapted for use in processing, for example, box blanks of a type shown in FIGS. 1 and 2. The box blank B is comprised of a plurality of adjacent panels 20, 22, 24 and 26 and a glue flap 28; end closure flaps for an erected box are shown at 30, 32, 34 and 36 for one end and 38, 40, 42 and 44 for the opposite end. Score lines 46 and 48 have been provided in the preceding printer-slotter-scorer machine or section as also have score lines 50, 52, 54 and 56 and these latter score lines are at right angles to the score lines 46, 48 and constitute the fold lines for the panels with respect to one another. Slotting of the board as shown at 58 between the various panel slots has also been accomplished in the preceding section of the machine.

When the box blank is to be folded into the condition shown in FIG. 2, there are two 180° folds which must be made and these are effected on score lines 50 and 54 as will be apparent from a study of FIG. 2. The various other score lines are at positions never necessitating a bend of over substantially 90°.

The present invention is accordingly directed more specifically to an accenting or re-scoring operation with respect to score lines 50 and 54 so as to obtain results in the folded blank and subsequently erected box as pointed out in the objects hereinbefore.

A main stationary frame of the machine is indicated at 60 to which are secured angles 62 which in turn through supports 64 mount and support an upper section of the machine. The members 62 and 64 are relatively slidable and the support 64 supports the extended end of the re-scoring section in conjunction with C-frames 66 in such a manner that the two side portions of the re-scoring and folding section can be laterally adjusted to accommodate different sizes and configurations of blanks to be processed. The construction and adjustability features of the multi-stage re-scoring section will be more readily apparent from various figures of the drawings, particular reference being made to FIG. 4. As pointed out hereinbefore, the re-scoring is accomplished by a plurality of pairs of score wheels mounted on each half of the machine. In the present embodiment, four pairs of scoring wheels generally indicated at 69 are provided in series. This number however is not critical and can be varied. For maximum flexibility, these are so devised as to permit progressive scoring and individual wheels can be individually or gang adjusted. In one embodiment of the machine, support rails 68 are provided which carry the lower scoring wheels. The support rails 68 are carried by lower side frames 70 supported by L-shaped members 71 mounted on the C-frames 66 and the upper ones of the scoring heads or wheels are suspended from upper side frames 72 carried by side frame support brackets 74. The upper scoring heads are mounted by means of bearing assemblies generally designated 76 and operatively associated with gears in an appropriate gear train 78 which is so driven as to be synchronized with the linear speed of board moving through the printer-slotter section through connection with transverse shaft 80 operatively connected through gear 82 to the main drive shaft of the machine. The support rails 68 holding the lower scoring wheels are held in fixed lateral relationship to each other by means of the C-frames 66 which are mounted on transverse tracks 84 by means of rollers 86 or the like. Upper side frames 72 carried by side frame support brackets 74 are also movable by virtue of track 88 and a trolley carriage arrangement 90 coacting therewith which is formed as a portion of brackets 74. A rack 92 engageable by pinions in the trolley carriage are utilized to simultaneously move the two C-frames toward or away from one another upon rotation of shaft 94 carrying the pinions by means of handwheels or the like, not shown. The lateral positioning of the scoring heads can accordingly be varied and adjusted for different sizes and forms of blanks and this can be facilitated by means of pointer 96 on brackets 74 in conjunction with scale 98. Suitably mounted fold rails 100 are operatively aligned with the scoring heads so that the score line will be relatively positioned to the outer upper edge of these score rails and which move with and are adjustable with the scoring heads to later coact with various other portions of the folder mechanism to insure proper folding of the box blanks.

The functions of the re-scoring operation are to improve the accuracy and uniformity with which the box blank can be folded in subsequent operations and fix the score with respect to the fold bars or rails. By making the score lines in stages, it is possible to make a more sharply defined score line without cracking the liners. It is also desirable, as will be pointed out hereinafter, to provide means for individually adjusting or gang adjusting the various heads and adjustable pressure means is also contemplated.

Figure 4:
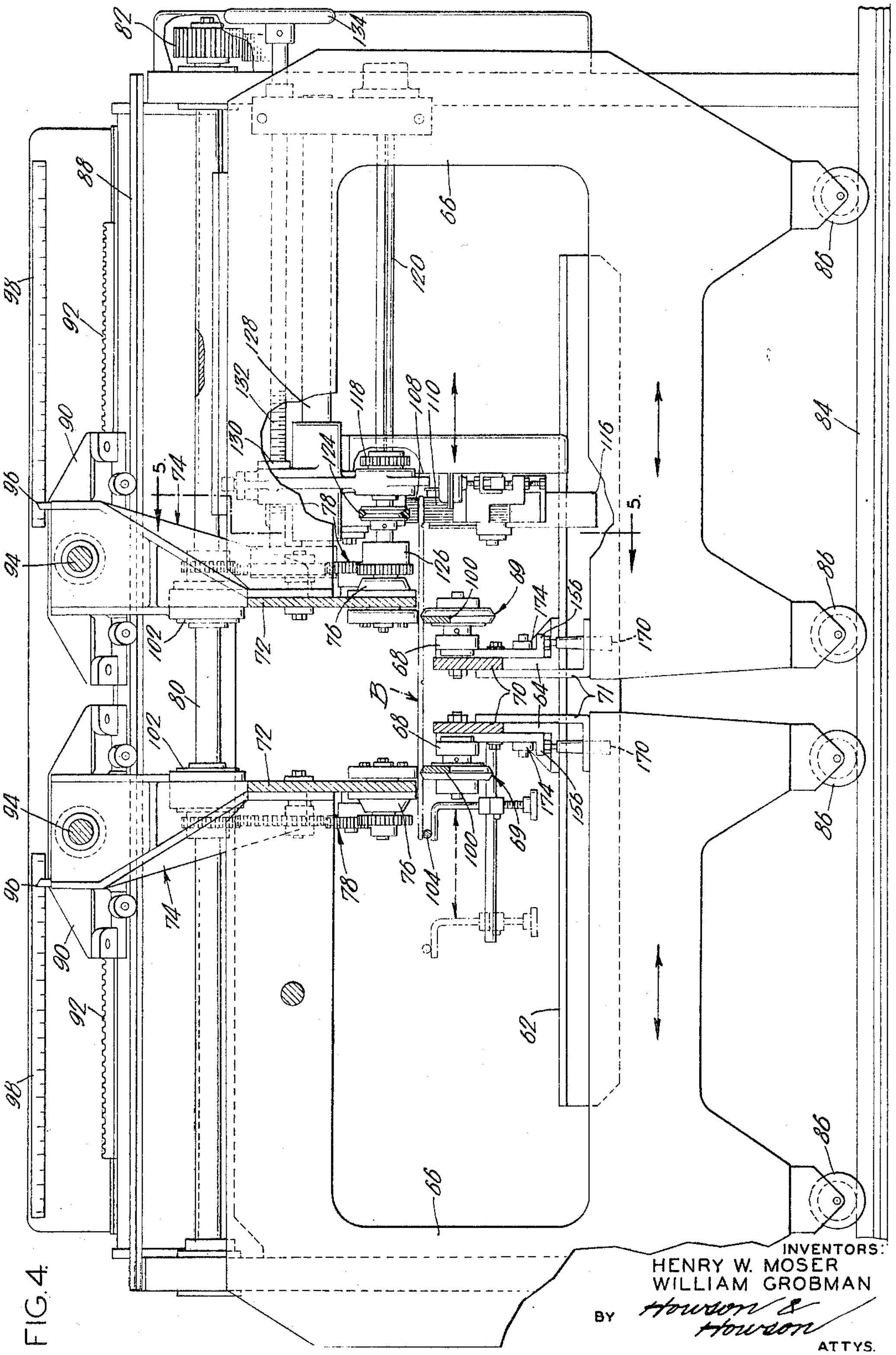
FIG. 4 is a sectional view through the machine taken on line 4, 4 of FIG. 3.

It is to be noted that the shaft 80 has a splined relationship with the bearing assemblies 102 carried by support brackets 74 to permit the transverse adjustment of these members. Adjustably mounted edge support means 104 can be provided if desired as shown in FIG. 4.

In this same section of the machine, as the blank progresses from the scorer rolls in the preceding section of the machine generally designated 106, the re-scoring and flap gluing processes are initiated. While this does not constitute a part of the presently claimed invention, there are shown upper and lower glue rolls 108 and 110 respectively, rotatably mounted and carried on upper and lower glue wheel frames 112 and 114. Glue reservoirs 116 are operatively associated with the glue wheels. Both wheels are gear driven in timed relation to board travel through an appropriate gear train generally designated 118 driven from shaft 120 operatively connected with the main drive for the machine. An idler drive is also provided to insure continued operation of the glue rolls when the machine is shut down which includes a motor 122 having an overrunning clutch thereon and driving through belt 124 and a suitable gear train connected to the glue rolls. An overrunning clutch 126 is provided in the main glue wheel drive section to permit activation of the idling drive.

Lateral adjustment of the glue rolls for different sizes of blanks is possible due to the mounting of the glue wheel frames on shaft 128, carrying an internally threaded arm 130 in operable engagement with threaded shaft 132, rotatably mounted and adapted for rotation through handwheel 134. This permits lateral adjustment in an obvious manner.

Figures 6, 7, 8, 9:
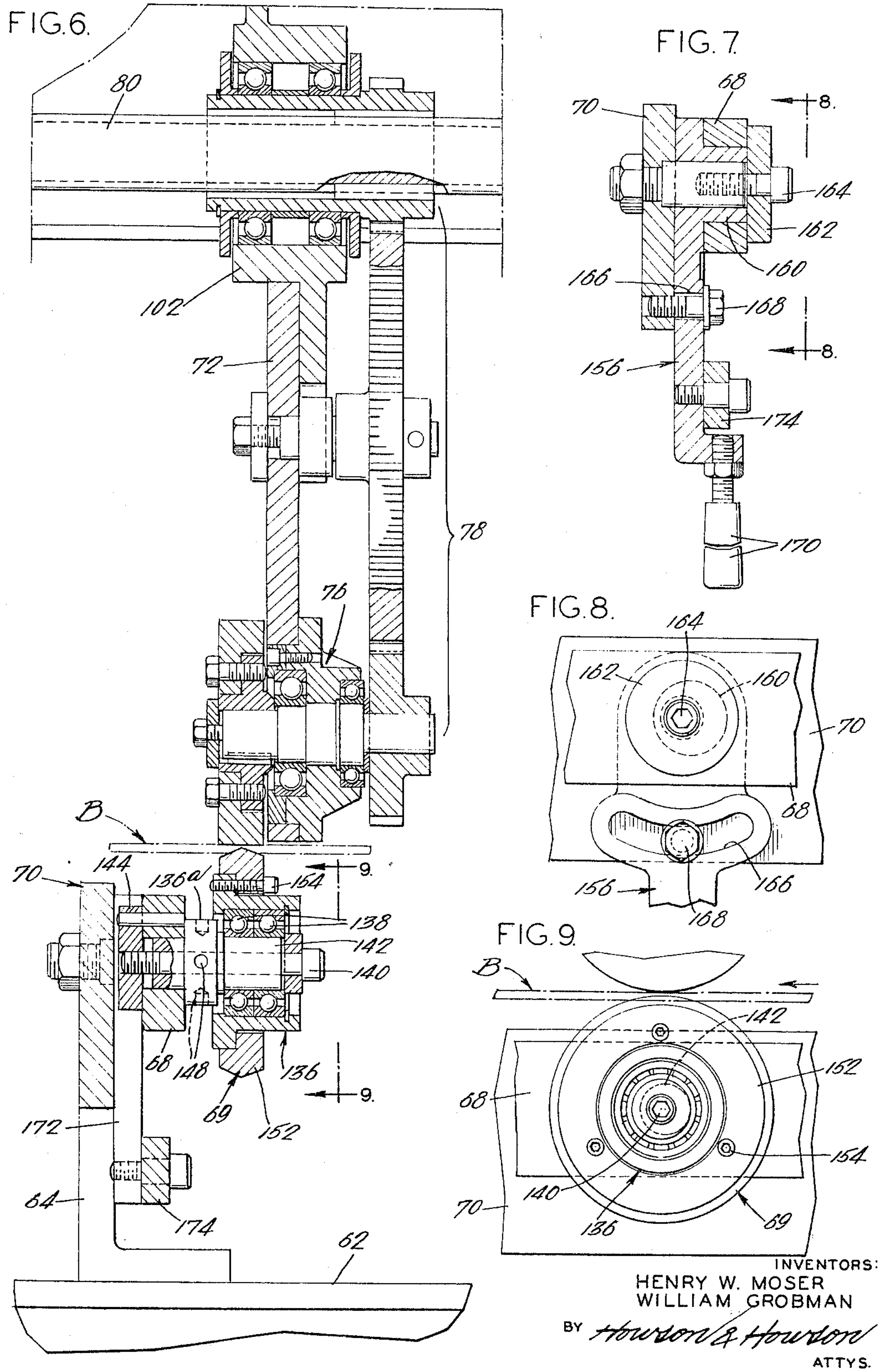
FIG. 6 is an enlarged sectional view taken on line 6, 6 of FIG. 5.
FIG. 7 is a sectional view taken on line 7, 7 of FIG. 5.
FIG. 8 is a fragmentary sectional view taken on line 8, 8 of FIG. 7.
FIG. 9 is an enlarged fragmentary sectional view taken on line 9, 9 of FIG. 6.
Figure 10:
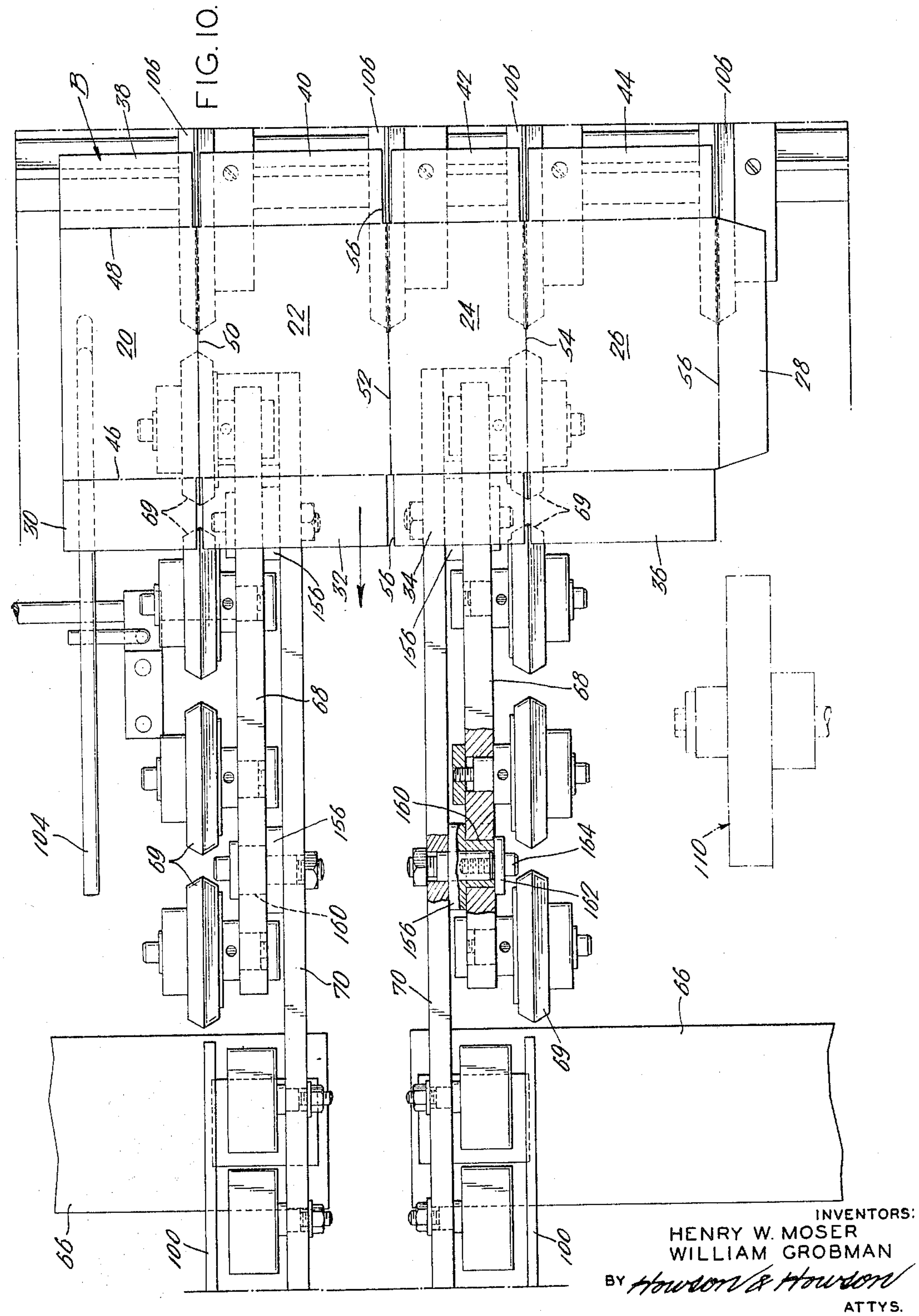
FIG. 10 is a sectional view taken on line 10, 10 of FIG. 5.

As hereinbefore noted, means are provided whereby individual scoring heads can be adjusted and/or the gangs of scoring heads can be adjusted for pressure control. Referring to FIG. 6, there is shown an individual scoring head adjusting means. It will be understood that while reference herein is made to only one of the scoring heads per se, each of the heads in the multiple scoring section is similarly constructed and mounted and like reference characters used apply to each of the others.

As illustrated, the scoring head includes a readily demountable scoring rim 152, secured by screws or the like 154, 154 to a flanged hub 136, said hub being rotatively journalled on anti-friction bearings 138 carried on the eccentric end portion of a sleeve 142. The sleeve has a flanged central portion **136*a* and has its opposite end adjustably secured in support rail 68 by means of locking bolt 140 and associated captive nut 144. Apertures 148** in the flanged portion facilitate adjustment of the sleeve by spanner wrench or the like.

When it is desired to raise or lower the scoring head, i.e., to vary the degree of nip between the scoring head and its associated pressure back-up roll, the locking bolt 140 is first loosened and the sleeve 136 adjusted rotatively to the degree desired after which the bolt is secured. From the foregoing it will thus be seen that individual and positive adjustment of each of the scoring heads is obtainable.

With reference to FIG. 6 it will also be noted that scoring rims 152 are quickly detachable from the hub 156 by simply removing bolts or other connecting means such as at 154 and replacing one ring with another one of perhaps a different configuration. The configuration of the scoring rings on various ones of the heads can be varied as desired depending upon a particular end result sought.

Figure 5:
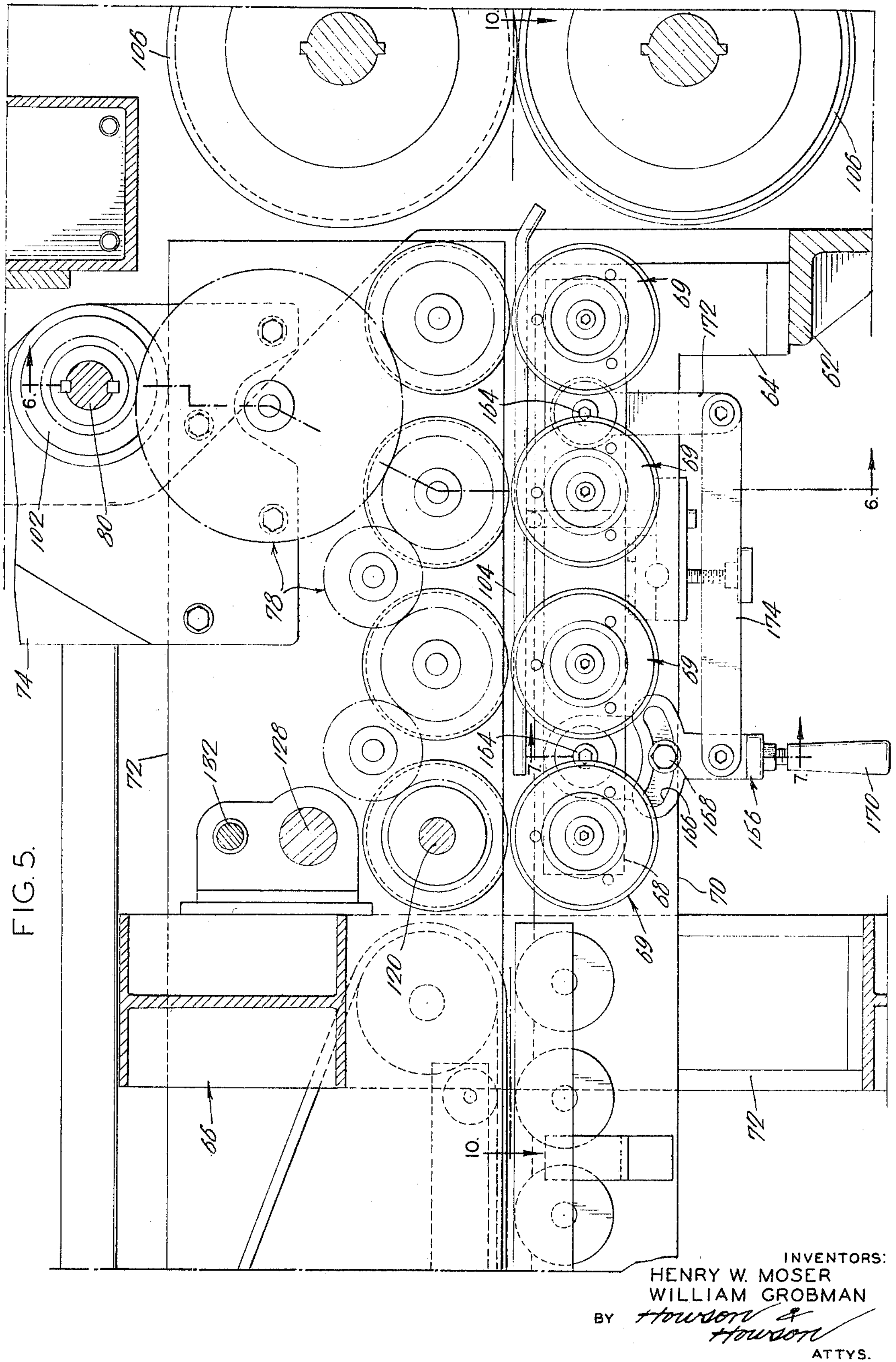
FIG. 5 is an enlarged sectional view taken on line 5, 5 of FIG. 4.

FIGS. 5, 7 and 8 disclose mechanism for gang adjustment of the lower scoring rolls. This includes an arm 156 secured to the lower side frame 70 by stud 158. The arm 156 has an eccentric hub portion 160 extending through a bore in support rail 68. A washer 162 and bolt 164 secure the hub in the support rail in a rotatable manner. An arcuate slot 166 is provided in the arm and a stud 168 passes therethrough and is screw-threadedly engaged in the arm. A handle 170 is secured to the end of this arm. A second arm 172 having a similar construction as regards the eccentric hub being mounted in the support rail, is connected with arm 156 as shown at 174 by pivotal connections. It will be apparent that upon movement of handle 170 the parallel lever or arm system operating through the eccentrics will raise or lower the entire support rail and therewith the scoring heads carried thereon.

Figure 11:
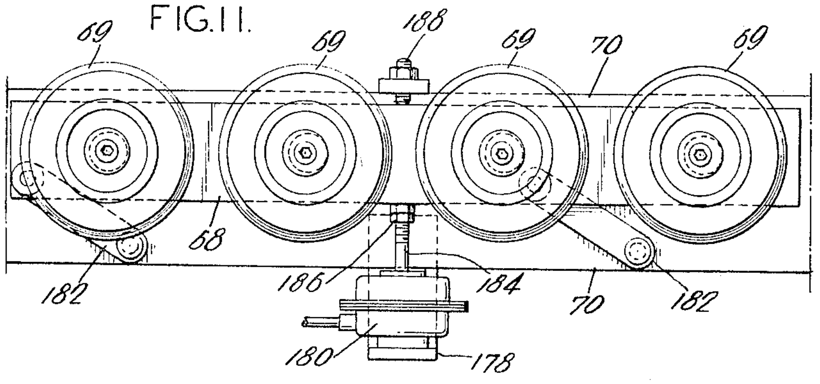
FIG. 11 is a fragmentary elevational view of a modified form of scoring wheel adjustment means operable upon the entire gang.
Figure 12:
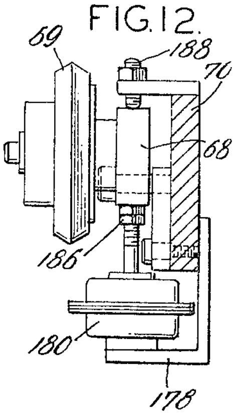
FIG. 12 is an elevational view, partly in section, taken at right angles to FIG. 11.

Modified gang adjustment means for the scoring heads is shown in FIGS. 11 and 12. An angle bracket 178 is mounted on and suspended from lower side frame 70 and supports an air cylinder 180 connected to a suitable source of air supply. The support rail 68 carrying the scoring rolls 69 is interconnected with the lower side frame 70 by toggle arms 182 to permit parallel adjustment or movement respectively. A piston arm 184 is operatively associated with the air cylinder and has adjustment nut means 186 thereon for engagement with the undersurface of support rail 68. An upper positioning or adjustment means 188 is provided for defining the upper limits of movement of the support rails and scoring heads thereon. By varying the pressure in air cylinder 180, the upward pressure, within defined limits, is imparted to the scoring heads.

Figure 13:
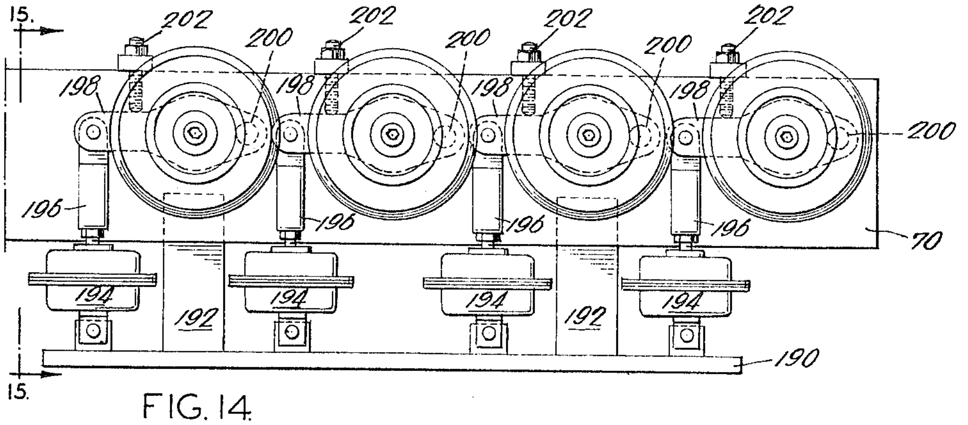
FIG. 13 is a view similar to FGI. 11 but showing a further modification wherein individual adjustment means are provided for each of the pairs of scoring wheels.
Figure 14:
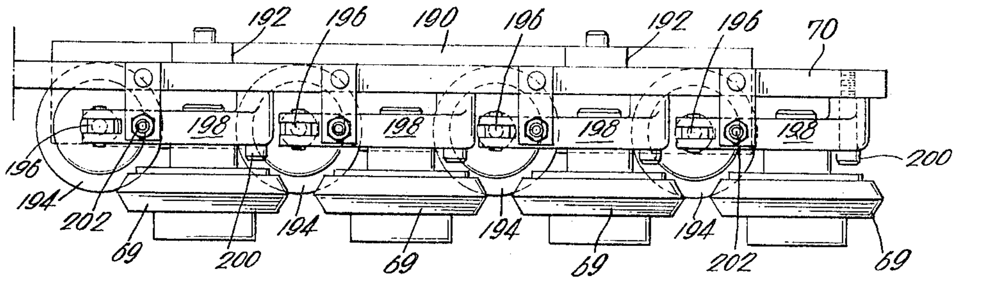
FIG. 14 is a plan view of the modification of FIG. 13.
Figure 15:
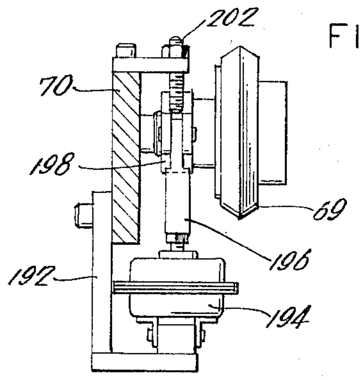
FIG. 15 is a fragmentary elevational view taken at right angles to FIG. 14.

A still further modification utilizing air as the pressure medium is shown in FIGS. 13–15 inclusive. These relate to an individual adjustment of the pressures of the individual scoring heads. Gang adjustment means for the scoring heads may also be utilized in this modification. A suitable gang adjustment means for this purpose is shown in FIGURE 11. A shelf bracket 190 is secured to lower side frame 70 by means of hangers 192 and pivotally mounts thereon a plurality of air cylinders 194 in equal number with the scoring heads. Each air cylinder has an upwardly extending piston arm 196 respectively connected to arms 198. These arms support the individual scoring heads in bearings and have their opposite ends pivotally mounted as at 200 in the lower side frame member. Adjustable upper limit stop means 202 coact with the arms for positive positioning of the heads. Individual adjustments of the individual heads can be effected by control of the air pressure in the various air cylinders in a manner similar to that of FIG. 11.

The foregoing description and the mechanism as shown in the drawings are directed to specific embodiments of the invention, although manifestly the principles involved and portions of the structure are susceptible of incorporation in other and different machines. Manifestly minor changes can be effected in the described and shown mechanism without departing from the spirit and scope of the invention as defined in and limited solely by the appended claims.

We claim:

1. In a glued flap box gluer-folder machine, transversely spaced adjustably mounted support rails at the entry end of said machine, a set of lower scoring wheels mounted on said support rails, a set of mating scoring wheels mounted in said machine above each of said lower scoring wheels for cooperation with said lower scoring wheels, means supporting said lower scoring wheels in fixed lateral relationship with respect to their mating scoring wheels thereabove, means mounting one of said sets of wheels for individual selective vertical adjustment of a single wheel relative to its rail for varying nip pressure between said lower wheels and said mating wheels, whereby a blank may be progressively scored deeper and deeper by passing between said wheels.

2. In a machine as claimed in claim 1 wherein said support means includes C-frames, each of said support rails being mounted on one of said C-frames, and means supporting said C-frames for movement toward and away from each other.

3. In a machine as claimed in claim 1 wherein said one set of wheels is the lower wheels.

4. In a machine as claimed in claim 1 wherein said means for vertical adjustment of said one set of wheels includes fluid pressure means.

5. Progressive scoring apparatus comprising a plurality of aligned lower and upper pairs of scoring wheels, means for gang adjusting said lower scoring wheels up and down to vary the nip pressure between each pair of upper and lower wheels, and means for selectively adjusting individual ones of said lower wheels up and down to vary the nip pressure between its respective upper wheel.

6. Apparatus in accordance with claim 5 further comprising C-frame supporting said wheels, said C-frames being mounted for lateral adjustment, and means connected to said wheels for driving both wheels in each pair of wheels.

7. Apparatus in accordance with claim 5 wherein at least one of said adjusting means includes an eccentric stud parallel to the axis of rotation of said wheels.

8. Apparatus in accordance with claim 5 including folding bars over which folds are to be made, said folding bars being aligned with the lower wheels in each set, said folding bars being positioned no higher than the uppermost surface of the lower scoring wheels.

9. Apparatus in accordance with claim 5 wherein said gang adjusting means includes a fluid pressure means.

10. Progressive scoring apparatus comprising a plurality of aligned lower and upper pairs of scoring wheels, means for gang adjusting said lower scoring wheels up and down to vary the nip pressure between each pair of upper and lower wheels, means for selectively adjusting individual ones of said lower scoring wheels up and down to vary the nip pressure between its respective upper wheel, C-frames supporting said wheels, said lower scoring wheels being supported by the lower arms on said C-frames, said upper wheels being supported by the upper arms on said C-frames, said C-frames being mounted for lateral adjustment, means connected to said wheels for driving both wheels in each pair of wheels, folding bars over which folds are to be made, said folding bars being supported by said C-frames, said folding bars being aligned with the lower wheels in each set, and said folding bars being positioned no higher than the uppermost surface of the lower scoring wheels.

References Cited by the Examiner

UNITED STATES PATENTS

| | | | |
|---|---|---|---|
| 1,408,486 | 3/1922 | Swift | 93—58.1 |
| 1,950,636 | 3/1934 | Swift | 93—58 |
| 2,982,189 | 5/1961 | Shields | 93—58.2 |

BERNARD STICKNEY, *Primary Examiner.*